United States Patent
Chhaya et al.

(10) Patent No.: US 12,361,300 B2
(45) Date of Patent: Jul. 15, 2025

(54) MACHINE-LEARNING TECHNIQUES APPLIED TO INTERACTION DATA FOR DETERMINING SEQUENTIAL CONTENT AND FACILITATING INTERACTIONS IN ONLINE ENVIRONMENTS

(71) Applicant: Adobe Inc., San Jose, CA (US)

(72) Inventors: Niyati Himanshu Chhaya, Telangana (IN); Niranjan Kumbi, Fremont, CA (US); Balaji Vasan Srinivasan, Bangalore (IN); Akangsha Bedmutha, San Mateo, CA (US); Ajay Awatramani, Fremont, CA (US); Sreekanth Reddy, Andhra Pradesh (IN)

(73) Assignee: ADOBE INC., San Jose, CA (US)

( * ) Notice: Subject to any disclaimer, the term of this patent is extended or adjusted under 35 U.S.C. 154(b) by 1016 days.

(21) Appl. No.: 17/237,892

(22) Filed: Apr. 22, 2021

(65) Prior Publication Data
US 2022/0343189 A1 Oct. 27, 2022

(51) Int. Cl.
*G06F 3/0482* (2013.01)
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 5/04; G06N 20/00; G06N 5/025; G06N 3/08; G06N 3/0442; G06N 3/045
See application file for complete search history.

(56) References Cited

U.S. PATENT DOCUMENTS

2019/0377785 A1* 12/2019 N ............................ G06F 40/20
2020/0081964 A1*  3/2020 Maneriker ............ G06F 40/103
2021/0117382 A1*  4/2021 Sriharsha .............. G06F 16/144
2021/0117415 A1*  4/2021 Sriharsha .............. G06F 16/242
(Continued)

FOREIGN PATENT DOCUMENTS

CN      108475290 A  *  8/2018  ....... G06F 17/30716
CN      111949131 B  *  4/2023  ............. G06F 3/013

OTHER PUBLICATIONS

Bansal et al., "Ask the GRU: Multi-Task Learning for Deep Text Recommendations", College of Information and Computer Sciences, University of Massachusetts Amherst, Sep. 9, 2016, 8 pgs.
(Continued)

*Primary Examiner* — Hassan Mrabi
(74) *Attorney, Agent, or Firm* — Kilpatrick Townsend & Stockton LLP

(57) ABSTRACT

Certain embodiments involve using machine-learning methods to generate a recommendation for sequential content items. A method involves accessing a content item associated with an interaction stage in an online environment. A stage graph, which includes a ratio of interactions, of the content item is generated. An additional content item that includes additional stage-transition content is identified. A sequencing function outcome indicating a portion of the ratio of interactions is determined. A transition probability of receiving an interaction with stage-transition content and an additional interaction with the additional stage-transition content is calculated. A content provider system is caused to provide a recipient device with interactive content that includes the additional content item.

20 Claims, 6 Drawing Sheets

(56) References Cited

U.S. PATENT DOCUMENTS

2021/0117857 A1* 4/2021 Sriharsha ............ G06F 18/2185
2021/0117868 A1* 4/2021 Sriharsha ............... G06F 17/18

OTHER PUBLICATIONS

Burke, "Hybrid Recommender Systems: Survey and Experiments", User Modeling and User-Adapted Interaction, 2002, pp. 331-370.
Chawla et al., "Sequence Learning using Content and Consumption Patterns for User Path Prediction", 2019 Association for Computing Machinery, 2019, 19-20.
Chawla et al., "Session-Based Path Prediction by Combining Local and Global Content Preferences", University of Southern California, Los Angeles, 2020, pp. 126-132.
Devlin et al., "BERT: Pre-Training of Deep Bidirectional Transformers for Language Understanding", Google AI Language, May 24, 2019.
Kim et al., "Dual Neural Personalized Ranking", 2019 International World Wide Conference Committee, 2019, 863-873.
Le et al., "Distributed Representations of Sentences and Documents", Google, Inc., May 22, 2014, 9 pgs.
Lee et al., "Making Personalized Recommendation through Conversation: Architecture Design and Recommendation Methods", IBM Almaden Research Center, 2018, pp. 727-730.
Liu et al., "Personalized News Recommendation Based on Click Behavior", Google Inc., 10 pgs.
Liu et al., "Personalization in Text Information Retrieval: A Survey", Journal of the Association for Information Science and Technology, 71(3), 2020, 349-369.
Moody, "Mixing Dirichlet Topic Models and Word Embeddings to Make lda2vec", May 6, 2016, 8 pgs.
Su et al., "A Survey of Collaborative Filtering Techniques", Department of Computer Science and Engineering, Florida Atlantic University, 2009.
Tan et al., "User Response Driven Content Understanding with Casual Inference", Yahoo Research, 2019, 1324-1329.
U.S. Appl. No. 16/830,886, filed Mar. 26. 2020.
Tensorflow, https://www.tensorflow.org/apt docs/python/tf.
Better Targeting for Brands, Retailers, and Data Providers, Precise Target, Available online at: https://web.archive.org/web/20210410215603/https://www.precisetarget.com/, Apr. 10, 2021, pp. 1-9.
Coveo for Commerce Transforms the Way Businesses Sell Online, Available online at: https://www.coveo.com/en/company/news-releases/2020/coveo-for-commerce-transforms-the-way-businesses-sell-online, Jan. 9, 2020, 5 pages.
Oracle Digital Assistant, Available online at: https://web.archive.org/web/20200924132600/https://www.oracle.com/in/solutions/chatbots/, Sep. 24, 2020, pp. 1-6.
Oracle Marketing, Available online at: https://web.archive.org/web/20210421163027/https://www.oracle.com/cx/marketing/, Apr. 21, 2021, pp. 1-23.
Globe Newswire, Precise Target Announces Consumer Taste Profiles, Globe Newswire, Precise Target, Available online at: https://www.globenewswire.com/news-release/2020/01/13/1969848/0/en/PreciseTarget-Announces-Consumer-Taste-Profiles.html, Jan. 13, 2020, 3 pages.

* cited by examiner

200

- 202 — Access, by a stage prediction module, a content item with stage-transition content associated with an interaction stage in an online environment
- 204 — Generate, by the stage prediction module, a stage graph of the content item, the stage graph indicating a ratio of interactions with the stage-transition content
- 206 — Identify, by a content sequencing module, an additional content item having additional stage-transition content associated with the interaction stage
- 208 — Determine, by a content sequencing module, a sequencing function outcome indicating a portion of the ratio of interactions with the stage-transition content, the portion associated with the additional stage-transition content
- 210 — Calculate, by the content sequencing module and based on the portion of the ratio of interactions, a transition probability of receiving an interaction with the stage-transition content and an additional interaction with the additional stage-transition content
- 212 — Cause, based on the transition probability exceeding a threshold, a content provider system to provide a recipient device with interactive content that includes the additional content item

FIG. 2

MACHINE-LEARNING TECHNIQUES APPLIED TO INTERACTION DATA FOR DETERMINING SEQUENTIAL CONTENT AND FACILITATING INTERACTIONS IN ONLINE ENVIRONMENTS

TECHNICAL FIELD

This disclosure relates generally to the field of machine-learning. More specifically, but not by way of limitation, this disclosure relates to using machine-learning techniques to facilitate interactions in online environments.

BACKGROUND

An online environment includes entities and interaction stages. The interaction stages are associated with various content items with which an entity, such as a user of an online environment, can interact. In some examples, an entity interacting with a content item associated with an interaction stage causes the entity to transition to an additional interaction stage, such as a subsequent stage. In some cases, a provider of the content item provides the content item for facilitating interaction within the online environment. In other cases, the provider of the content item provides the content item for transitioning the entity to the additional interaction stage.

The online environment that includes the entities and the interaction stages, in some examples, includes large-scale (e.g., billions or more) combinations of entities, interaction stages, and content items associated with the interaction stages. In some cases, contemporary techniques for selecting content to provide in the online environment involve selecting or recommending a content item that is customized for an entity, such as a content item for transitioning the entity from one interaction stage to another. The contemporary techniques typically rely on manual content-selection techniques. In some examples, manual techniques for content selection or content recommendation cannot efficiently or accurately select a content item within the large-scale combinations. For example, manual content-selection techniques, such as selection of a content item by a person managing a website, could be inefficient for analysis of the large-scale combinations of content items with recipient entities. Thus, contemporary techniques for facilitating interaction in the online environment fail to provide content that is customized for entities that interact with content items within the online environment.

SUMMARY

Certain embodiments involve using machine-learning methods to generate a recommendation for sequential content items. In some cases, a method involves accessing a content item. The content item has stage-transition content associated with an interaction stage in an online environment. In some examples, a stage graph, which indicates a ratio of interactions with the stage-transition content, is generated. An additional content item that includes additional stage-transition content is identified. The additional stage-transition content is associated with the interaction stage. In some examples, a sequencing function outcome indicating a portion of the ratio of interactions is determined. The portion of the ratio of interactions is associated with the additional stage-transition content. A transition probability of receiving an interaction with stage-transition content and an additional interaction with the additional stage-transition content is calculated. The transition probability is calculated based on the portion of the ratio of interactions. A content provider system is caused to provide a recipient device with interactive content that includes the additional content item.

Some embodiments involve a system for generating a recommendation for sequential content items. In some examples, the system includes a stage prediction module and a content sequencing module. The stage prediction module is configured for generating a first representation structure of a first content item that includes first stage-transition content associated with an interaction stage in an online environment. The representation structure includes (i) a first stage graph, which indicates a ratio of interactions with the first stage-transition content, of the first content item and (ii) features of the first content item. The content sequencing module is configured for identifying a second content item, which includes second stage-transition content associated with the interaction stage, the second content item represented by a second representation structure. The content sequencing module is configured for applying a sequencing function to the first representation structure and the second representation structure to determine a portion of the ratio of interactions with the first stage-transition content. The portion of the ratio of interactions is associated with the second stage-transition content. The content sequencing module is configured for calculating, based on the portion of the ratio of interactions, a transition probability of receiving a first interaction with the first stage-transition content and a second interaction with the second stage-transition content. The content sequencing module is configured for selecting the second content item as a sequential content item for the first content item.

Other embodiments involve a non-transitory computer-readable medium embodying program code for generating a sequence of content items. In some examples, the program code comprises instructions which, when executed by a processor, cause the processor to perform operations. The operations include receiving a representation structure of a content item that includes stage-transition content associated with an interaction stage in an online environment. The representation structure includes a stage graph of the content item that indicates a ratio of interactions with the stage-transition content. The operations include identifying a sequential content item for the content item from a transition probability that indicates a likelihood of receiving an interaction with the stage-transition content and an additional interaction with additional stage-transition content of the sequential content item. The operations include causing a sequence of interactive content to be generated. The sequence of interactive content includes the content item followed by the sequential content item.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 is a flowchart depicting an example of a process for using machine-learning techniques to generate a sequence of content items, according to certain embodiments.

DETAILED DESCRIPTION

Figure 1:
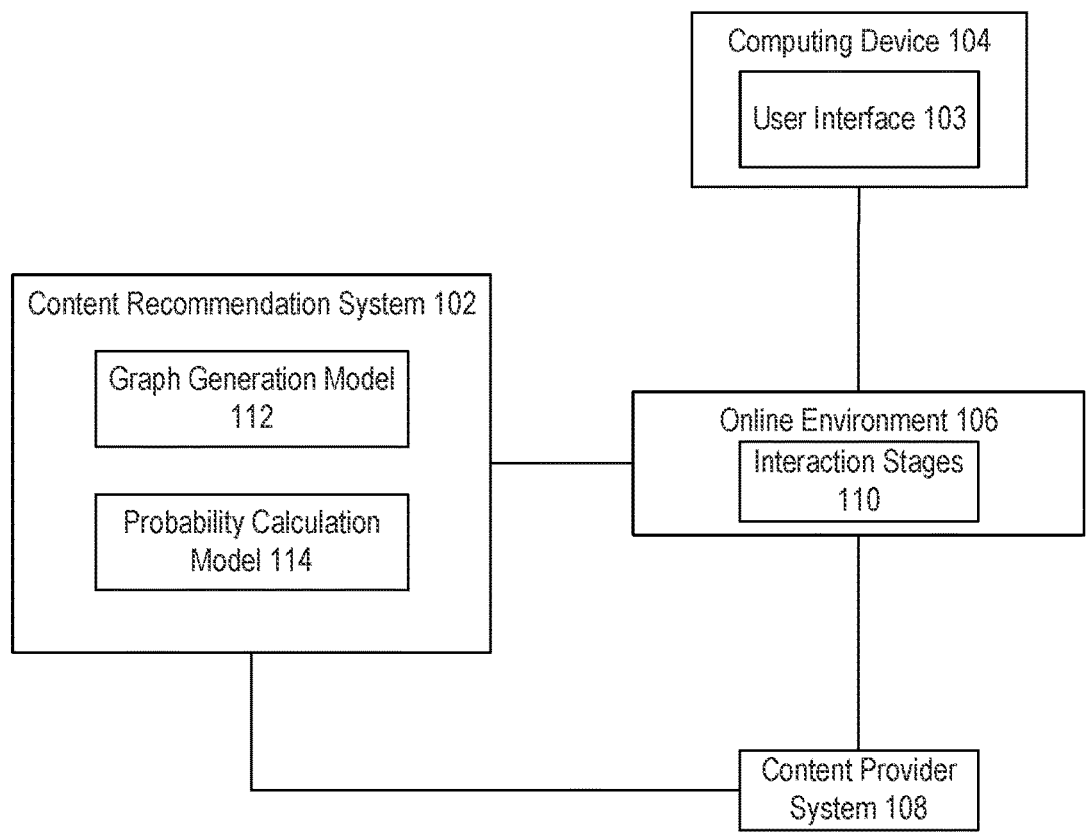
FIG. 1 is a diagram depicting an example of a computing environment in which machine-learning techniques are applied for generating a sequence of content items, according to certain embodiments.

As discussed above, contemporary techniques for facilitating interactions in an online environment do not effectively select content items for an entity that is interacting with the online environment. Additionally or alternatively, the contemporary techniques use manual efforts, such as by a person who is managing a website or online communications, to provide content in the online environment. However, the contemporary techniques can inefficiently or inaccurately select custom content for large-scale combinations of entities, interaction stages, and content items in the online environment. For example, the contemporary techniques rely on manual processing, which is slow and does not allow customization, by individuals for selecting content items. Additionally or alternatively, the contemporary techniques merely provide general content recommendations that are not customized or otherwise entity-specific, not stage-specific, or a combination thereof.

The issues can be addressed by certain embodiments described herein. For example, certain embodiments involve a content recommendation system that applies machine-learning techniques to facilitate interaction of entities with interactive content in an online environment. The example content recommendation system includes a stage prediction module and a content sequencing module. The stage prediction module includes a machine-learning model for determining a stage graph representation of a content item. The stage graph indicates interactions with the content item, such as a ratio of interactions by entities at a first interaction stage compared to interactions by entities at a second interaction stage. The interaction stages can include particular activities performed in the online environment, such as accessing a technical document for software or applying a patch for the software. The content sequencing module includes a machine-learning model to automatically calculate transition probabilities for content items within the online environment, such as a transition probability for whether the example software patch is applied after interacting with one or more content items. The transition probabilities are calculated based on at least a portion of the ratio of interactions. For instance, a transition probability for a particular content item, such as an email article describing the example software patch, is calculated by identifying a portion of entity interactions with the particular content item that causes the entity to transition to a particular interaction stage, such as a stage that includes downloading and applying the software patch. In some cases, the content recommendation system determines a subset of the content items that have a transition probability exceeding a threshold value, such as a threshold value indicating a threshold likelihood of an entity transitioning to a particular interaction stage. The content recommendation system can provide, such as to a content provider system, an indication of a recommended content item with a transition probability that exceeds the threshold value. In some cases, the content provider system provides the recommended content item to an entity in the online environment. In some cases, identifying interactive content using the machine-learning models for facilitating the interaction improves customization of content, thereby increasing a likelihood of an entity interacting with the content. Additionally or alternatively, interactions of the entity with the identified interactive content can cause the entity to transition to different interaction stages, facilitating interactions in the online environment. For example, identifying the example email article that describes the software patch and providing the example email article to a computing device of a person could facilitate how quickly the software patch is applied to the computing device.

The following examples are presented to introduce certain embodiments of the present disclosure. In this example, a content recommendation system accesses a content item that includes stage-transition content associated with an interaction stage in an online environment, such as a website that provides a software update. A stage prediction module in the content recommendation system applies a machine-learning model, such as a graph generation model, to the content item. The stage prediction module, in this example, uses the content item to generate a stage graph that describes interactions with the stage-transition content. For example, the stage prediction module determines how likely a computing device of a user is to interact with the stage-transition content based on various factors, such as historical interactions, profile information such as a user login, and the like. In some examples, a content sequencing module of the content recommendation system applies a machine-learning model, such as a probability calculation model, to an additional content item. In some examples, the machine-learning model of the content sequencing module is different than the machine-learning model of the stage prediction module. The content sequencing module identifies an additional content item having additional stage-transition content that is associated with the interaction stage. The content sequencing module performs a sequencing function that returns a portion of a ratio of interactions that are associated with the additional stage-transition content. For example, the portion can include a subset of the interactions. Based on the subset, the content sequencing module calculates a transition probability for receiving an interaction with the stage-transition content and receiving an additional interaction with the additional stage-transition content. The machine-learning models, in some examples, facilitate interactions in the online environment by causing one or more identified content items with transition probabilities that exceed a threshold probability to be transmitted to a recipient device. In this example, the content recommendation system causes the content provider system to provide the identified content items to a user device in the online environment, such as a computing device that is compatible with the software update. For instance, the content recommendation system provides to the content provider system an indication of a recommended content item with a transition probability that exceeds the threshold value.

Certain embodiments described herein provide improved techniques for facilitating interactions in online environments. For example, machine-learning techniques are applied to content items to calculate transition probabilities of the content items, such as a probability of an entity transitioning between interaction stages. In some cases, multiple machine-learning models apply particular rules to generate a recommendation for a sequence of content items. Additionally or alternatively, interactions of the multiple machine-learning models can improve accuracy of a content item recommendation. In some examples, a stage graph module applies particular rules to generate a stage graph of stage-transition content such that the stage graph includes a ratio of interactions of the stage-transition content. Additionally or alternatively, a content sequencing module applies additional rules to calculate a sequencing function outcome that is used, in combination with the ratio of interactions, to calculate the transition probabilities. In some embodiments, the machine-learning models more efficiently calculate the transition probabilities for a large group of content items (e.g., hundreds or thousands) in the online environment, as compared to a contemporary technique that utilizes manual efforts for content selection. In some cases, a content recommendation system that applies the described techniques can reduce labor-intensive time and effort, such as by a website manager, to select content that facilitates interactions by entities in the online environment.

Examples of a Computing Environment for Determining Content Sequence

Referring now to the drawings, FIG. 1 depicts an example of a computing environment 100 in which machine-learning techniques are applied for generating a sequence of content items, according to certain embodiments described in the present disclosure. As illustrated, the computing environment 100 includes a content recommendation system 102, a computing device 104, an online environment 106, and a content provider system 108. Other suitable components are usable within the computing environment 100 for generating the sequence of content items. In some examples, the content recommendation system 102 is communicatively coupled to the online environment 106. Additionally or alternatively, the computing device 104 interacts with the online environment 106. For instance, the computing device 104 receives inputs from an entity, such as a user of the computing device 104. Additionally or alternatively, the computing device 104 includes a user interface 103 via which inputs (or outputs) are received from (or provided to) the entity. In other examples, the content recommendation system 102 is communicatively coupled to the content provider system 108.

In some embodiments, the online environment 106 includes (or otherwise can access) a set of interaction stages 110. The interaction stages 110 include varying content items with which the computing device 104 interacts. In some examples, each interaction stage of the interaction stages 110 includes one or more content items that are different from one or more content items included in an additional interaction stage of the interaction stages 110. The content recommendation system 102 includes one or more machine-learning models, such as a graph generation model 112 and a probability calculation model 114. In some cases, the graph generation model 112 and the probability calculation model 114 include one or more of a deep neural network, a recurrent neural network, or any other suitable type, or combination of types, of neural networks.

The graph generation model 112 and the probability calculation model 114, in some embodiments, are configured to provide content sequence recommendations. The graph generation model 112 accesses a content item that is associated with a particular interaction stage of the interaction stages 110. The graph generation model 112 is applied to the content item to generate a stage graph. In some embodiments, the stage graph for a particular content item includes a ratio of interactions that characterizes historic interactions with the particular content item. Additionally or alternatively, the ratio of interactions characterizes further interactions with further content items, such as further content items that are similar to the particular content item associated with the stage graph. The ratio of interactions, for instance, indicates interactions by multiple computing devices associated with multiple entities. The probability calculation model 114 identifies an additional content item within the particular interaction stage. In some examples, the probability calculation model 114 uses the additional content item to determine a subset of the ratio of interactions that is associated with additional stage-transition content. In some examples, the additional stage-transition content is designed or otherwise intended to cause the computing device 104 to transition between the interaction stages 110, such as by encouraging an entity to perform, via the computing device 104, an interaction with the additional stage-transition content. The probability calculation model 114, in some embodiments, is applied to the portion of the ratio of interactions to calculate a transition probability. For example, the probability calculation model 114 (or another component of the content recommendation system 102) could identify the ratio portion by determining a subset of the interactions identified by the stage graph, such as a subset of interactions that are associated with each of the particular content item and the additional content item.

In some examples, the content recommendation system 102 compares one or more calculated transition probabilities to a threshold transition probability value. For instance, responsive to determining that the transition probabilities of the content item and the additional content item exceed (or otherwise fulfill) the threshold value, the content recommendation system 102 generates or modifies a content sequence recommendation to include one or more of the content item or the additional content item. In some cases, the content recommendation system 102 provides the content recommendation sequence to the content provider system 108. For example, the content recommendation system 102 causes one or more of the content item or the additional content item to be provided to the online environment 106, or to the computing device 104. Additionally or alternatively the content recommendation system 102 provides the transition probabilities of the content item or the additional content item to the online environment 106. In some cases, the content recommendation sequence identifies a sequence of the content item with the additional content item as a content sequence that can facilitate a transition of the computing device 104 between (or among) the interaction stages 110.

Exemplary Process of Determining a Content Sequence

FIG. 2 depicts an example of a process 200 for using machine-learning techniques to generate a sequence of content items, according to certain embodiments described in the present disclosure. In some embodiments, such as described in regards to FIG. 1, a computing device executing a content recommendation system implements operations described in FIG. 2, by executing suitable program code. For illustrative purposes, the process 200 is described with reference to the components illustrated in FIG. 1, though other implementations are possible. In some embodiments, one or more operations described herein with respect to the process 200 can be used to implement one or more steps for generating a sequence of content items.

At block 202, the process 200 involves accessing, such as by a stage prediction module, a content item with stage-transition content. In some cases, the stage-transition content is associated with an interaction stage in an online environment. For example, the content recommendation system 102 accesses a content item with stage-transition content associated with an interaction stage of the interaction stages 110 in an online environment 106. In some examples, the content recommendation system 102 uses a stage prediction module to access the content item. The interaction stage, in some embodiments, is performed via the computing device 104 such that the computing device 104 is interacting with (or otherwise associated with) content items from the interaction stage. In some examples, the stage-transition content includes content that is designed to encourage transition of the computing device 104 from a first interaction stage to a second interaction stage of the interaction stages 110.

At block 204, the process 200 involves generating, such as by the stage prediction module, a stage graph of the content item. In some cases, the stage graph indicates a ratio of interactions with the stage-transition content. For example, the content recommendation system 102 generates a stage graph of the content item. The content recommendation system 102 uses the stage prediction module to generate the stage graph. In some embodiments, the stage prediction module applies a first machine-learning model, such as the graph generation model 112, to the stage-transition content to generate the stage graph. In some embodiments, the first machine-learning model includes a multi-task model that utilizes bidirectional encoder representations from transformers ("BERT-based"), or other suitable machine-learning models. In some examples, the stage graph includes or otherwise indicates a ratio of interactions with the stage-transition content. In some embodiments, the ratio of interactions characterizes interactions of the computing device 104 with the stage-transition content or with additional stage-transition content, such as additional content that is similar or identical to the stage-transition content. Additionally or alternatively, the ratio of interactions characterizes interactions of additional computing devices (e.g., associated with multiple entities) with the stage-transition content, or the additional stage-transition content.

At block 206, the process 200 involves identifying, such as by a content sequencing module, an additional content item having additional stage-transition content associated with the interaction stage. In some examples, the content recommendation system 102 identifies an additional content item having additional stage-transition content associated with the interaction stage. The content recommendation system 102, for instance, applies a second machine-learning model, such as the probability calculation model 114, to identify the additional content item. In some examples, the second machine-learning model includes a bi-direction gated recurrent unit ("bi-directional GRU," "BiGRU"), or other suitable machine-learning models. In some examples, the content sequencing module applies the second machine-learning model, such as the probability calculation model 114, to the additional content item or other suitable content. Additionally or alternatively, the second machine-learning model receives as an input one or more outputs from the first machine-learning model. For example, the probability calculation model 114 receives as an input the stage graph that is provided as an output by the graph generation model 112.

At block 208, the process 200 involves determining, by the content sequencing module, a sequencing function outcome indicating a portion of the ratio of interactions with the stage-transition content. For example, the sequencing function outcome could be generated by the second machine-learning model that is included in the content sequencing module. The portion of the ratio of interactions is associated with the additional stage-transition content. In some examples, the content recommendation system 102 determines a sequencing function outcome indicating a portion of the ratio of interactions with the stage-transition content and with the additional stage-transition content. For example, the portion could indicate one or more subsets of interactions that interact with the stage-transition content and with the additional stage-transition content. In some cases, the portion indicates multiple interactions, such as sequential interactions, that transition a computing device (or an entity using the computing device) between or among interaction stages. In some examples, the content recommendation system 102 uses the content sequencing module to determine the sequencing function outcome. In some examples, the content sequencing module applies a probability calculation model to determine the sequencing function outcome.

At block 210, the process 200 involves calculating, by the content sequencing module, a transition probability, such as a transition probability associated with one or more of the content item or the additional content item. For instance, the transition probability describes a probability of receiving an interaction with the stage-transition content and an additional interaction with the additional stage-transition content. Additionally or alternatively, the transition probability is calculated using the portion of the ratio of interactions. In some examples, the content recommendation system 102 calculates the transition probability of receiving an interaction and an additional interaction that are performed by the computing device 104. In some embodiments, the interaction, the additional interaction, or a combination thereof, causes the computing device 104 to transition between or among the interaction stages 110. The content recommendation system 102 uses, for example, the content sequencing module to calculate the transition probability, such as by applying the probability calculation model 114 to the sequencing function outcome. In some examples, the transition probability is calculated by applying the probability calculation model 114 to one or more of a stage graph or a ratio of interactions indicated by the stage graph, such as the portion of the ratio of interactions.

At block 212, the process 200 involves causing a content provider system to provide a recipient device with interactive content that includes the additional content item. Causing the content provider system to provide the interactive content is responsive, for example, to determining that the transition probability associated with the additional content item exceeds (or otherwise fulfills) a threshold value. In some examples, the content recommendation system 102 causes the content provider system 108 to provide a recipient device, such as the computing device 104, with interactive content that includes the additional content item. The content provider system 108, in some examples, receives the interactive content that includes the additional content item. Additionally or alternatively, the content provider system 108 is communicatively coupled to, or otherwise included in, the content recommendation system 102.

Figure 3:
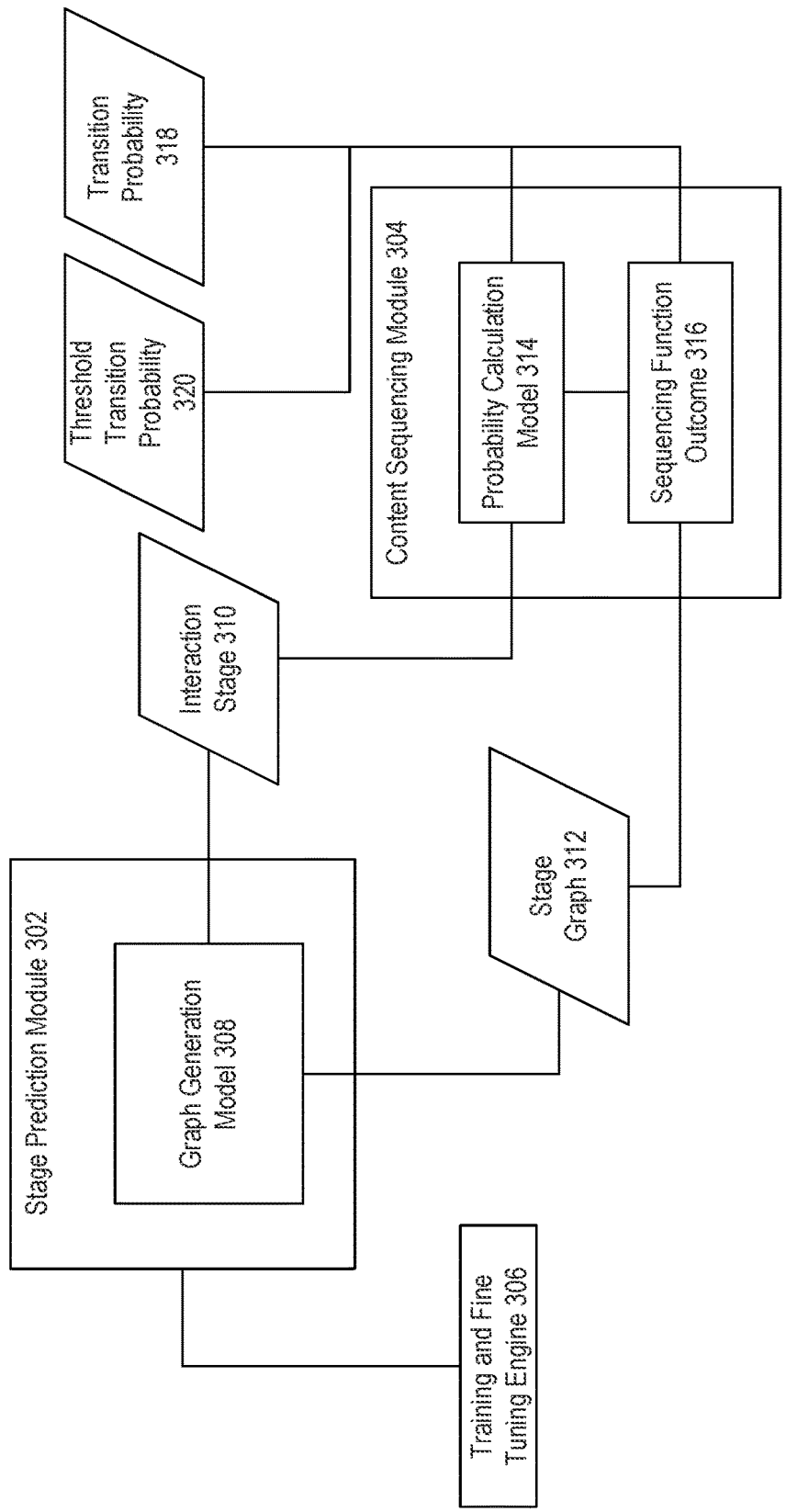
FIG. 3 is a diagram of a computing system that includes multiple machine-learning models for generating a sequence of content items, according to certain embodiments.

Examples of a Computing System and Architecture for Determining Content Sequence FIG. 3 depicts an example of a computing system 300 that includes one or more machine-learning models for generating a sequence of content items. For example, the computing system 300 includes a stage prediction module 302 and a content sequencing module 304. Additionally or alternatively, the computing system 300 can include additional modules, machine-learning models, or other components that are usable for generating the sequence of content items. In some embodiments, the stage prediction module 302 is pre-trained via a training and fine-tuning engine 306. For example, the training and fine-tuning engine 306 uses one or more of historical content items or historical interaction data to train and to fine-tune the stage prediction module 302. In some cases, the training and fine-tuning engine 306 receives one or more historical corpuses of content-specific language or other content-specific training data, such as a historical corpus of content items that include language related to a specific topic of content (e.g., language related to applying a software patch). The stage prediction module 302 includes a graph generation model 308. In some examples, the graph generation model 308 receives, as an input, a data structure that describes an interaction stage 310 of an online environment, such as the online environment 106. The interaction stage 310, in some examples, is an interaction stage included in the interaction stages 110. Additionally or alternatively, the interaction stage 310 is associated with one or more content items, such as content items that include stage-transition content that facilitates a transition to or from the interaction stage 310. The graph generation model 308 is configured to generate a stage graph 312 of a first content item associated with the interaction stage 310. In some cases, the first content item is associated with one, some, or all interaction stages in the computing system 300. For example, the stage graph 312 indicates interactions with stage-transition content of the first content item, such as interaction by multiple computing devices. Additionally or alternatively, the stage graph 312 indicates whether a particular interaction transitions a particular computing device to a particular one of the interaction stages.

In FIG. 3, the content sequencing module 304 includes a probability calculation model 314 and a sequencing function outcome 316. In some embodiments, the probability calculation model 314 receives, as an input, the data structure describing the interaction stage 310. For example, the probability calculation model 314 uses content items associated with the interaction stage 310 to generate the sequencing function outcome 316. Additionally or alternatively, the probability calculation model 314 provides the sequencing function outcome 316 as an output. In some examples, the stage graph 312 is used by the content sequencing module 304 to calculate at least one transition probability 318. Additionally or alternatively, the transition probability 318 is associated with a content item, such as a second content item associated with the interaction stage 310. The transition probability 318 characterizes a likelihood of a computing device, such as the computing device 104, transitioning between the interaction stage 310 and an additional interaction stage of the computing system 300 via an interaction with stage-transition content of the second content item. For example, the transition probability 318 indicates a probability that a computing device that interacts with the first contact item also interacts with the second content item. In some examples, the content sequencing module 304 calculates (or otherwise receives) a threshold transition probability 320. For example, the threshold transition probability 320 is used by the computing system 300 to determine whether one or more of a content item or an additional content item, such as the first or second content items associated with the interaction stage 310, are provided to the content provider system 108. In some cases, the computing system 300 provides a particular content item to a content provider system responsive to determining that the transition probability 318 associated with the particular content item exceeds the threshold transition probability 320. For instance, the computing system 300 generates a content sequence that includes one or more of the first or second content items and provides the content sequence to the content provider system, such as the content provider system 108.

Figure 4:
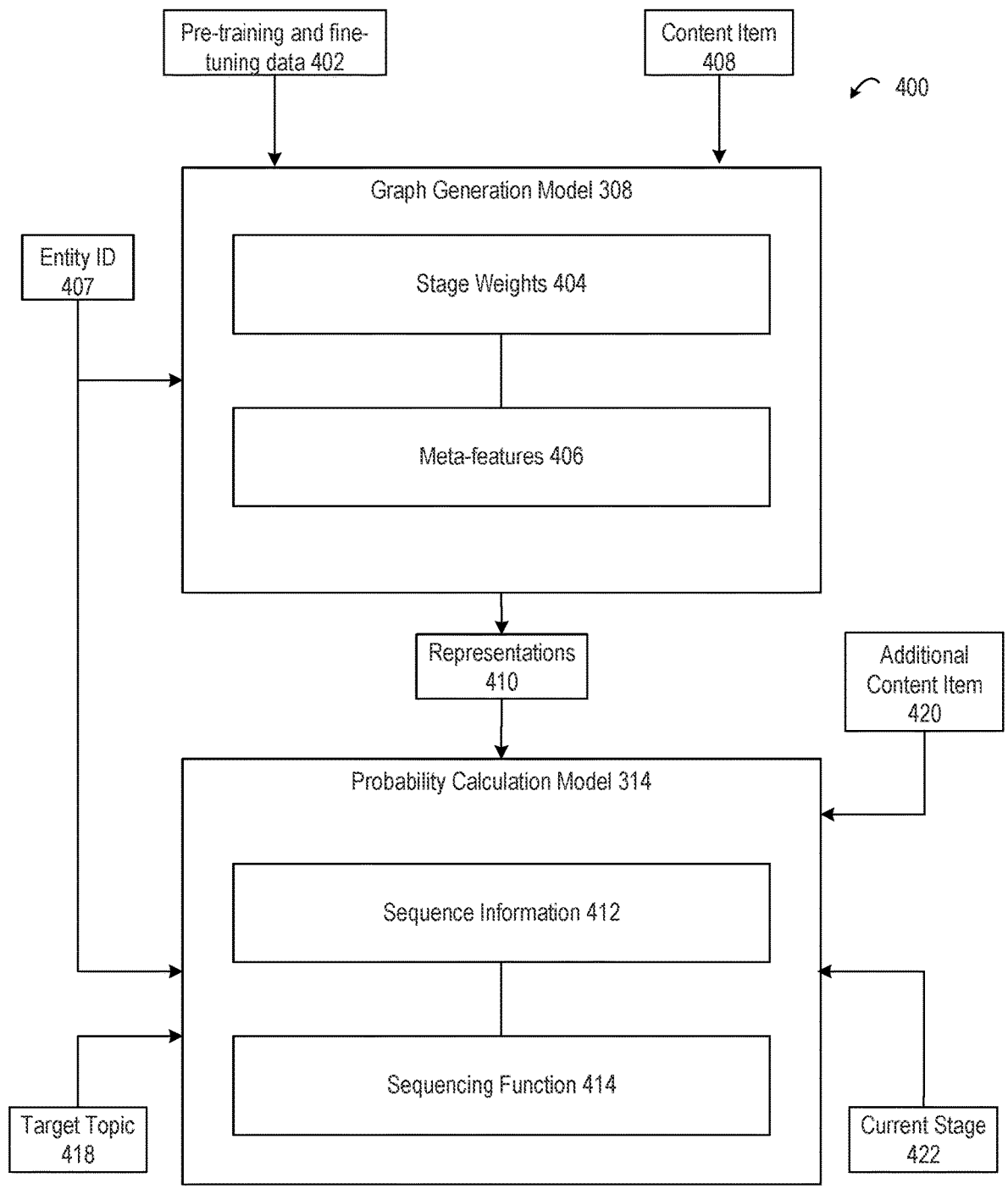
FIG. 4 is a diagram of an architecture of a computing system that includes at least two machine-learning models for generating a sequence of content items, according to certain embodiments.

FIG. 4 depicts an example of an architecture 400 of a computing system that includes multiple machine-learning models for generating a sequence of content items. For example, the architecture 400 includes the graph generation model 308 and the probability calculation model 314. In some examples, the graph generation model 308 or the probability calculation model 314 include one or more of a multi-task model, a BERT-based multi-task model, a bi-directional GRU, a recurrent neural network, or other suitable machine-learning model, or combination of machine-learning models. In some embodiments, one or more of the graph generation model 308 or the probability calculation model 314 are trained on one or more corpuses of training data. For instance, the graph generation model 308 includes a BERT-based model that is pre-trained or fine-tuned, or both, with a corpus of content items that include language related to a specific topic of content (e.g., language related to applying a software patch). In some cases, the training data (e.g., for pre-training, fine-tuning, or both) for the graph generation model 308 includes historical content items with language similar to language of content items associated with an interaction stage, such as the interaction stage 310. Additionally or alternatively, the probability calculation model 314 includes a bi-directional GRU that is trained with interaction data, such as interaction data for historical content items. In some cases, the training data for the probability calculation model 314 includes interaction data for the historical content items in the training data of the graph generation model 308. In some examples, the architecture 400 includes additional or alternative architectural components for generating content sequences.

In FIG. 4, one or more of the graph generation model 308 or the probability calculation model 314 are pre-trained or fine-tuned (or both) using pre-training and fine-tuning data 402. For example, the data 402 includes at least one corpus, such as a corpus of text data, that is related to one or more training content items that are associated with one or more interaction stages. Additionally or alternatively, the data 402 includes interaction data for the training content items, such as historical interactions that have transitioned at least one computing device among the one or more interaction stages. In some cases, performing one or more of pre-training or fine-tuning of the models 308 or 314 improves performance of the models 308 or 314, such as by customizing performance to one or more interaction stages in a content recommendation system. Additionally or alternatively, fine-tuning or pre-training the models 308 or 314 includes comparing an output of one or more of the models 308 or 314 to data included in the data 402. For example, the data 402 includes historical data indicating one or more of historical content items or stage transitions of an entity associated with a computing device that interacts with the historical content items. In some cases, a particular historical content item is considered positive-class content if the entity transitioned to a subsequent stage after having interacted with the particular historical content item. Additionally or alternatively, an additional historical content item is considered negative-class content if the entity transitioned to a previous stage after having interacted with the additional historical content item.

In some examples, the graph generation model 308 receives as input one or more of an entity ID 407, a content item 408, or other suitable information. Additionally or alternatively, the graph generation model 308 produces representation data, such as representations 410, as an output. In some examples, the representations 410 are described by a data structure that is generated or otherwise provided by the graph generation model 308. Additionally or alternatively, the representations 410 include one or more representation data structures, such as a respective representation structure for each particular content item received by a content recommendation system. The representations 410 include, for example, one or more stage graphs, such as the stage graph 312. In some embodiments, the graph generation model 308 generates a particular stage graph for each particular content item that is received by the graph generation model 308, such as the stage graph 312 associated with the content item 408. In some cases, the stage graph 312 is provided as an input to the probability calculation model 314. Additionally or alternatively, the probability calculation model 314 receives as input one or more of the entity ID 407, a target topic 418, an additional content item 420, or a current interaction stage 422. In some cases, the probability calculation model 314 produces an output that includes a particular transition probability for each particular content item that is received by the graph generation model 308, such as the transition probability 318 for the additional content item 420.

In some embodiments, the graph generation model 308 includes one or more of stage weights 404 or meta-features 406. The stage weights 404, in some examples, are determined by applying the graph generation model 308 to interaction data associated with interaction stages (e.g., the interaction stage 310). For instance, the graph generation model 308 determines, such as for the content item 408, sequence-to-sequence embeddings that represent stage transitions associated with the content item 408. Additionally or alternatively, the graph generation model 308 generates (or modifies) the stage weights 404 to include (or otherwise represent) the sequence-to-sequence embeddings for one or more stage graphs, such as the stage graph 312 for the content item 408. For example, the sequence-to-sequence embeddings are represented by vector data, such as an n-bit vector in which each particular bit is associated with a particular one of n interaction stages. In the stage weights 404, each particular bit of the n-bit vector associated with the stage graph 312 has a value indicating a ratio of interactions with the content item 408 that transition a computing device to the particular one of the n interaction stages. For example, the ith bit has a value indicating the ith ratio of interactions that transitions a computing device to the ith interaction stage. As a non-limiting example, if the content item 408 has one hundred associated interactions, and thirty of the associated interactions result in a computing device transitioning to a "patched" interaction stage (e.g., applying a software patch), the vector value associated with the "patched" interaction stage may indicate a ratio of thirty out of one hundred. In some examples, the ratio of interactions is represented as a percentage, but other data formats are possible, including data formats not intended for human interpretation.

In some embodiments, one or more of the stage weights 404 or a particular stage graph, e.g., the stage graph 312, include one or more nodes or edges. For example, each node represents a particular interaction stage, and each edge represents a ratio of interactions. In some examples, the sequence-to-sequence embeddings represent a particular node as a particular bit in the n-bit vector and a particular edge as a value of the particular bit. In some cases, the stage weights 404 are included in the representations 410 generated by the graph generation model 308.

In FIG. 4, the meta-features 406 include features of one or more content items, such as the content item 408. The meta-features 406 describe, for example, content features, topic features, campaign features, and other suitable features. Content features could include features that describe content included in one or more content items, such as a data type (e.g., text, video, hyperlink), a size of a content item, a number of words, a number of sentences, a grammar style (e.g., punctuation, capitalization), an affect indicator, an emotion indicator, part-of-speech tags, or other suitable meta-features of content that could be included in a content item. Topic features could include features that describe a topic of one or more content items, such as a subject of content items, an audience of content items, or other suitable meta-features that describe a topic of content items. Campaign features could include features that describe a group of multiple related content items, such as a region indicator, an indicator for multimodal data, an indicator of content type (e.g., email, webinar, weblink), or other suitable meta-features of a campaign of content items. In some cases, the meta-features 406 are included in the representations 410 generated by the graph generation model 308.

In some embodiments, one or more of the meta-features 406 are identified by the graph generation model 308. Additionally or alternatively, one or more of the meta-features 406 are identified by an additional machine-learning model. For example, a machine-learning model configured to identify topic features of content, such as an LDA2vec model, is applied to one or more content items. In some cases, identifying the topic features is performed in parallel with generating the stage graph 312, the stage weights 404, or additional features (e.g., other than topic features) in the meta-features 406. In some embodiments, including topic features with the representations 410 facilitates better prediction by a content recommendation system that uses the architecture 400.

In FIG. 4, the graph generation model 308 generates the representations 410 using a concatenation (or other combination) of one or more of the stage weights 404 or the meta-features 406. Additionally or alternatively, the graph generation model 308 includes one or more classification heads configured to classify one or more portions of the concatenated representation. For example, a dense layer or a softmax layer is applied to one or more of the stage-graph features or the topic features. In some cases, the graph generation model 308 is trained end-to-end on a joint loss from the classification heads or regression heads.

In FIG. 4, the probability calculation model 314 includes one or more of sequence information 412 or a sequencing function 414. Additionally or alternatively, the probability calculation model 314 receives, as an input, some or all of the representations 410 that are provided as an output from the graph generation model 308. The probability calculation model 314, in some examples, calculates the transition probability 318 based on the representations 410, such as by calculating a probability of computing device interacting with the content item 408 and the additional content item 420. In some cases, one or more content items are represented by a feature vector representation. For example, an additional machine-learning model, such as a doc2vec model, is applied to one or more of the content item 408 or the additional content item 420. Additionally or alternatively, the feature vector representing a particular content item is concatenated or otherwise combined with one or more additional feature vectors, such as additional feature vectors representing additional content items, vector data structures from the representations 410, or other suitable feature vectors related to content items or interaction stages. In some cases, the probability calculation model 314 retrains using one or more of the feature vectors, such as a retraining via an average treatment effect analysis.

In some embodiments, the representations 410 include information about the stage graph distribution of the input content. In some cases, data in the representations 410 indicates, such as via a respective n-bit vector, a respective stage graph for each of the content item 408 and the additional content item 420. In some cases, one or more of the graph generation model 308 or the probability calculation model 314 is trained to calculate the vector values of the stage graphs, such as during training that is performed using historic data describing interactions with the content items. Additionally or alternatively, one or more of the graph generation model 308 or the probability calculation model 314 is configured (e.g., subsequent to training) to calculate the vector values of the stage graph, such as via a prediction by the graph generation model 308. In some cases, a stage graph that is associated with a particular content item is modified to include data values for combinations of content items, such as an average of vector values for multiple content items belonging to a content topic.

In some examples, the probability calculation model 314 receives as an input an entity action vector. For example, the representations 410 can include the entity action vector. In some cases, the entity action vector includes data representing one or more historical interactions received for a content item that includes stage-transition content. Additionally or alternatively, the entity action vector includes data values indicating average historical interactions for multiple content items, such as multiple content items belonging to a particular content topic. In FIG. 4, the representations 410 include multiple vector data structures that are associated with one or more content items. For example, representations for a particular content item could include a concatenation of vectors representing one or more of the stage weights 404, the meta-features 406, the stage graph for the particular content item, an average stage graph for a content topic of the particular content item, an entity action vector, an average entity vector for the content topic of the particular content item, or any suitable combination of these or other vector representations related to the particular content item. In some cases, concatenated vector representations are encoded as input data for one or more of the graph generation model 308 or the probability calculation model 314 such as input data associated with a content item.

The sequence information 412, in some examples, includes the transition probability 318, a sequencing function outcome 316, or other suitable information. The sequencing function 414 includes one or more parameters that are modified (e.g., during a training phase) such that the sequencing function is capable of calculating a relationship between (or among) an input content item and one or more additional content items. For example, the sequencing function 414 calculates, for the content item 408, a quantity of interactions that are associated with the additional content item 420. In some cases, the quantity of interactions indicates a portion of total interactions with the content item 408 that lead to interactions with the additional content item 420. Parameters included by the sequencing function 414 can include, for instance, one or more of a reward score, a penalty score, a convergence threshold, or other suitable parameters of a modeling function. In some embodiments, the reward score includes a combination of a probability to reach a goal interaction stage and a probability of interaction of an entity with stage-transition content, such as in a content item associated with the interaction stage 310. Additionally or alternatively, the penalty score can include a probability of an entity not interacting with the content. In some examples, the sequencing function 414 is used to calculate or otherwise determine the threshold transition probability 320.

In some embodiments, the probability calculation model 314 receives as input one or more of the entity ID 407, the target topic 418, the additional content item 420, or the current stage 422. In some examples, the probability calculation model 314 indicates a sequence of content items that are identified as facilitating a transition (e.g., of an entity) to a target stage, such as a target stage identified by the content provider system 108. For example, a target stage of a software provider includes the computing device 104 applying a software update from the software provider. The probability calculation model 314 calculates, for example, a transition probability indicating a likelihood that an entity would transition to the target stage if provided with a content sequence that includes the content item 408 and the additional content item 420.

In some embodiments, a search space of content items is determined from a set of content items received by one or more of the models 308 or 314. Additionally or alternatively, the search space of content items is determined by filtering the set of content items, such as filtering according to interaction history by an entity in various interaction stages. In some embodiments, the probability calculation model 314 is used to recommend content from the filtered set. Additionally or alternatively, a content recommendation system that includes the architecture 400 identifies a content search space for a combination of a particular entity and a particular interaction stage. In some cases, identifying a content search space that is reduced in size provides greater computing efficiency for the content recommendation system. The variety of content items is large, and, thus, it is not feasible to search an entire space when generating the content sequence to the given entity due to the computational complexity. To identify the content search space, the content recommendation system (such as the content recommendation system 102 or another suitable computing system) selects content items that have historically facilitated interactions by various entities in the online environment 106. In some examples, the content search space is reduced or otherwise filtered by selecting the content items having stage-transition content that have facilitated a computing device in transitioning to the target interaction stage. For instance, the content recommendation system identifies the content search space by selecting content items with a respective transition probability that is greater than (or otherwise fulfills) a threshold value, such as the threshold transition probability 320. A set that includes content items with respective transition probabilities that fulfill a threshold transition probability 320 is denoted as $C_{thresh}$. In some cases, the content search space is filtered by identifying content items belonging to the target topic, such as a set of content items denoted $C_{topic}$. In some examples, the set $C_{topic}$ of content items that are related to the target topic is selected using a topic detection model, such as the LDA2vec model described above. Additionally or alternatively, the content search space is filtered by identifying content items with which a computing device (e.g., associated with the entity ID) has previously interacted, such as a set of content items denoted $C_{entity}$. For instance, if the entity ID is given as input, the content items with which an associated computing device has interacted are identified or selected, such as a set of content items denoted as $C_{entity}$. In some cases, the content search space is filtered by identifying content items having topics with which the computing device associated with the entity ID has previously interacted, such as a set denoted $C_{lt}$. In some embodiments, the content search space is defined by the union of $C_{thresh}$, $C_{topic}$, $C_{entity}$, and $C_{lt}$. In other embodiments, the content search space is defined by the intersection of $C_{thresh}$, $C_{topic}$, $C_{entity}$, and $C_{lt}$.

Figure 5:
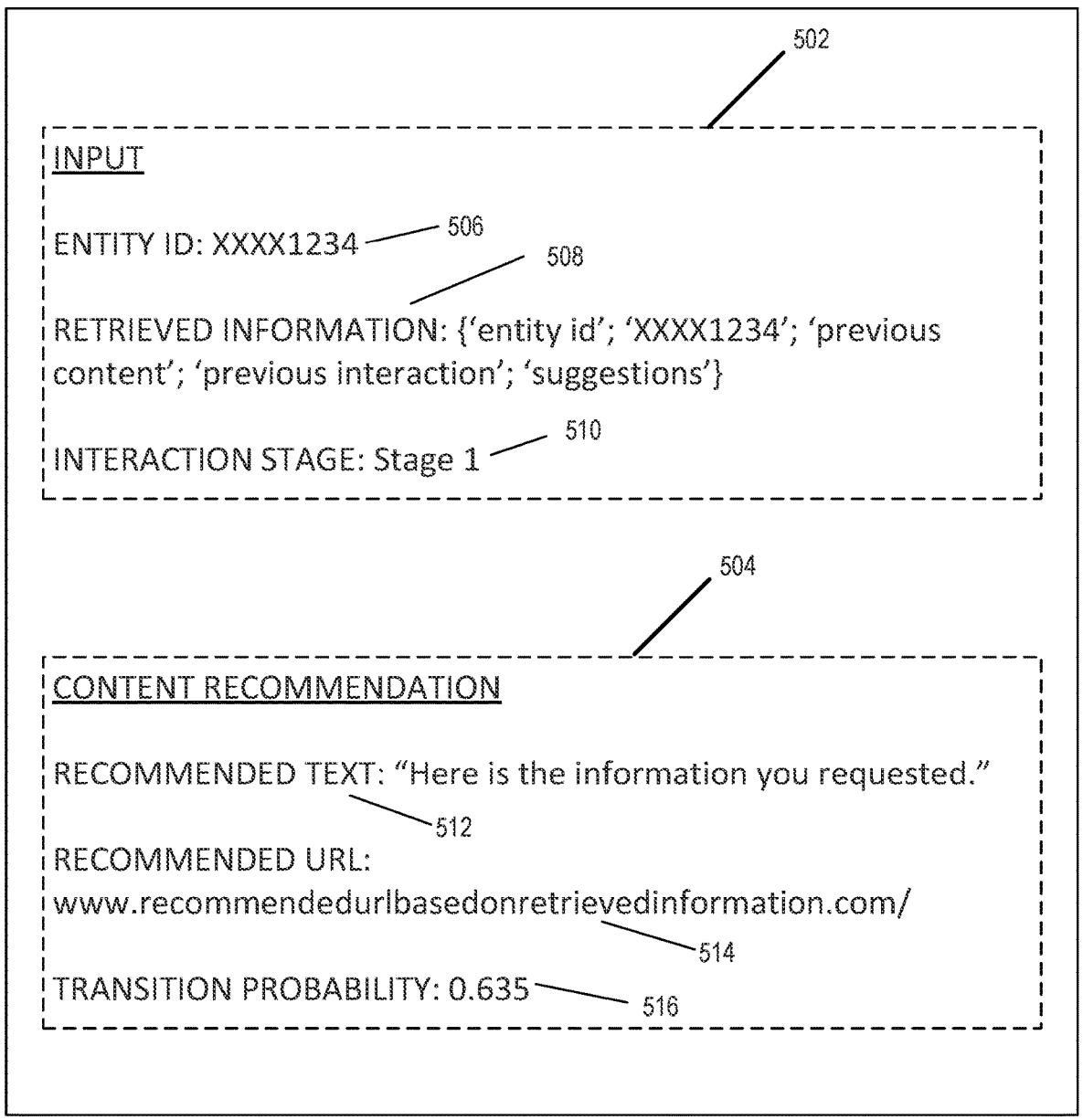
FIG. 5 is a diagram of a user interface that includes input and output of a computing system for generating a sequence of content items, according to certain embodiments.

Examples of Input and Output of a Computing System that Generates Content Sequences FIG. 5 depicts an example of a user interface 500 configured to receive inputs to or present outputs from a computing system for generating a sequence of content items, according to certain embodiments. In some cases, the user interface 500 is included in (or otherwise communicatively coupled to) a content recommendation system, such as the content recommendation system 102. In FIG. 5, the user interface 500 includes an input section 502 and a recommendation section 504. The input section 502 is configured to receive one or more of an entity ID 506, retrieved information 508, or an interaction stage 510, such as input data that is received via a user input to the user interface 500, a query response received from an additional computing system, or another suitable technique. The entity ID 506, in some examples, is associated with a computing device (e.g., associated with an entity), such as a computing device that can receive a content item associated with data presented in the recommendation section 504. Additionally or alternatively, the entity ID 506 is usable to determine characteristics of the computing device.

In the user interface 500, the retrieved information 508 includes information that is associated with the entity ID 506. For example, the content recommendation system 102 generates a query (e.g. to a database or an additional computing system) that requests one or more of historical interaction data, a current interaction stage, historical content topics, or other information associated with the entity ID 506. The interaction stage 510, in some embodiments, is included in a group of interaction stages, such as the interaction stages 110. Additionally or alternatively, the interaction stage 510 indicates a target interaction stage, such as an example "patched" interaction stage in which a software patch is applied to the computing device associated with the entity ID 506.

In the user interface 500, the recommendation section 504 is configured to display (or otherwise present) one or more of a recommended text 512, a recommended URL 514, or a transition probability 516. For example, the content recommendation system 102 identifies a particular content item, such as by applying one or more machine-learning models (such as described in regards to FIG. 4) to data associated with the entity ID 506 or the retrieved information 508. The identified content item includes, for instance, content that includes the recommended text 512, or stage-transition content that includes the recommended URL 514. In some embodiments, stage-transition content could include one or more of a URL, an email address, a telephone number, a registration form, a downloadable software item, or other suitable content to transition a computing device (or entity) among interaction stages.

The recommended text 512, in some examples, is included in (or otherwise associated with) the particular content item identified by the content recommendation system 102. For example, the recommended text 512 includes text that facilitates interactions of the computing device associated with the entity ID 506. The recommended URL 514, in some embodiments, includes a uniform resource link ("URL") or web address that facilitates interactions of the computing device associated with the entity ID 506. For example, the computing device could receive one or more of the recommended text 512 or the recommended URL 514 in a content item that is provided by the content provider system 108 or the content recommendation system 102.

In some embodiments, the transition probability 516 is calculated by the content recommendation system 102 for the identified content item, such as by applying one or more machine-learning models (such as described in regards to FIG. 4). For example, the transition probability 516 represents a probability of the computing device associated with the entity ID 506 interacting with the content (e.g., text 512 or URL 514) recommended within the recommendation section 504.

Example of a Computing System for Implementing Certain Embodiments

Figure 6:
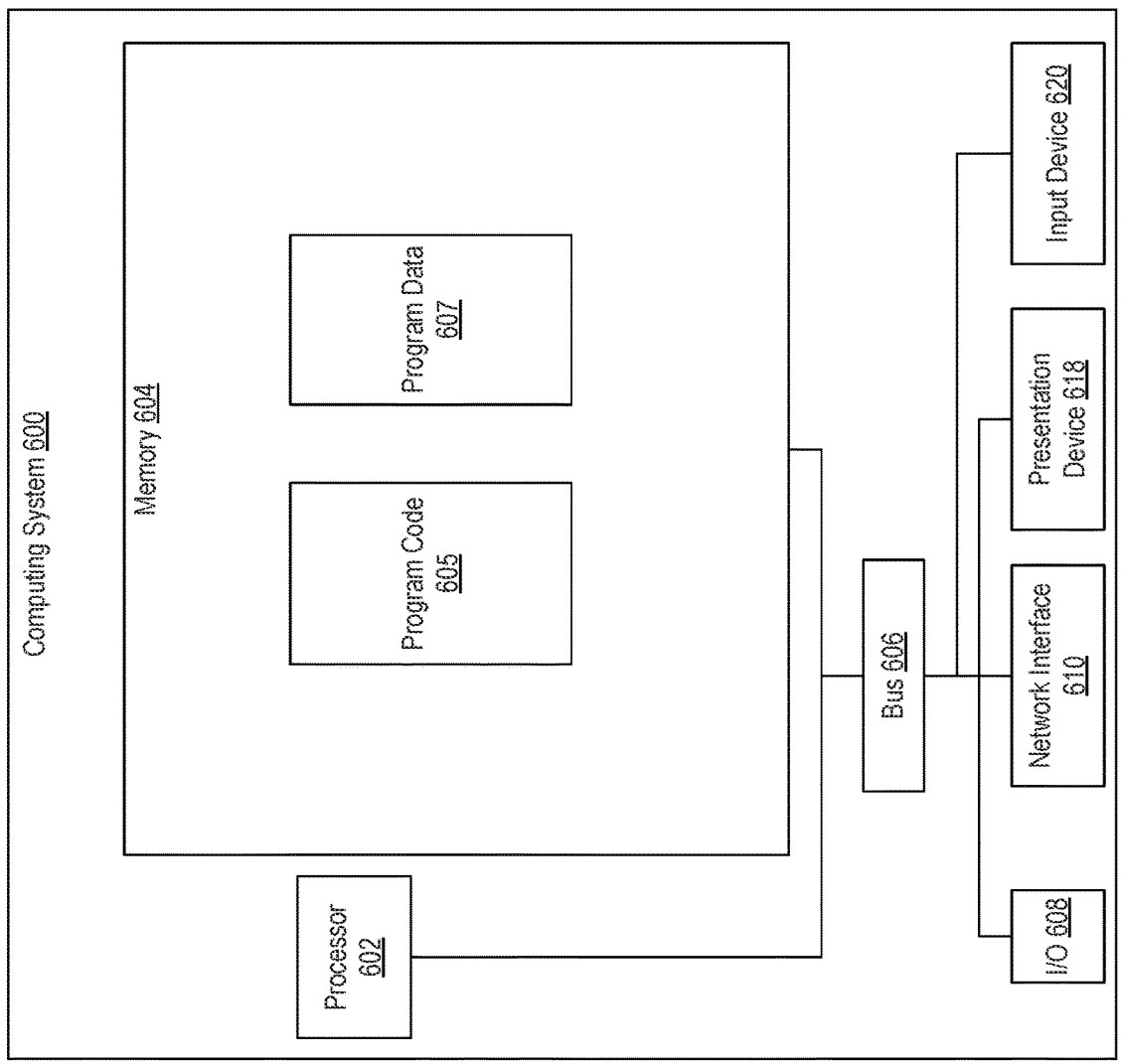
FIG. 6 is a diagram of a computing system for implementing machine-learning techniques for generating a sequence of content items, according to certain embodiments.

Any suitable computing system or group of computing systems can be used for performing the operations described herein. For example, FIG. 6 depicts an example of the computing system 600. The implementation of computing system 600 could be used for a content recommendation system 102 or other suitable computing system. In other embodiments, a single computing system 600 having devices similar to those depicted in FIG. 6 (e.g., a processor, a memory, and the like) combines the one or more operations and data stores depicted as separate systems in FIG. 1.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code 605, program data 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, an input device 620, a presentation device 618, or other input or output devices. For example, the computing system 600 includes one or more input/output ("I/O") interfaces 608. An I/O interface 608 can receive input from input devices or provide output to output devices. One or more buses 606 are also included in the computing system 600. The bus 606 communicatively couples one or more components of a respective one of the computing system 600.

The computing system 600 executes program code 605 that configures the processor 602 to perform one or more of the operations described herein. Examples of the program code 605 include, in various embodiments, modeling algorithms executed by the content recommendation system 102, the computing system 300, the architecture 400, or other suitable computing systems or applications that perform one or more operations described herein. The program code may be resident in the memory device 604 or any suitable computer-readable medium and may be executed by the processor 602 or any other suitable processor.

In some embodiments, one or more memory devices 604 store program data 607 that includes one or more datasets and models described herein. Examples of datasets include interaction data, training data, parameter values, and the like. In some embodiments, one or more of data sets, models, and functions are stored in the same memory device (e.g., one of the memory devices 604). In additional or alternative embodiments, one or more of the programs, data sets, models, and functions described herein are stored in different memory devices 604 accessible via a data network.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a user device) via a data network using the network interface device 610.

In some embodiments, the computing system 600 also includes the input device 620 and the presentation device 618 depicted in FIG. 6. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, and the like. A presentation device 618 can include any device or group of devices suitable for providing visual, auditory, or other suitable sensory output. Non-limiting examples of the presentation device 618 include a touchscreen, a monitor, a speaker, a separate mobile computing device, and the like.

Although FIG. 6 depicts the input device 620 and the presentation device 618 as being local to the computing device that executes the content recommendation system 102, other implementations are possible. For instance, in some embodiments, one or more of the input device 620 and the presentation device 618 can include a remote client-computing device that communicates with the computing system 600 via the network interface device 610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method of generating a recommendation for sequential content items for causing transitions among multiple interaction stages in an online environment, the method comprising:
   accessing, by a first machine-learning model included in a stage prediction module configured for determining content interaction likelihoods, a content item from a set of multiple content items, the content item having stage-transition content associated with multiple interaction stages in an online environment, wherein the multiple interaction stages are represented by a vector data structure;
   generating, by the first machine-learning model in the stage prediction module, a stage graph of the content item, the stage graph indicating i) a ratio of interactions with the stage-transition content and ii) transitions among the multiple interaction stages;

modifying, by the first machine-learning model, the vector data structure to represent the stage graph of the content item;

modifying the set of multiple content items to generate a reduced set of multiple content items, the modifying based on historical interactions with each respective content item included in the set of multiple content items:

identifying, from the reduced set of multiple content items and by a second machine-learning model included in a content sequencing module configured for calculating a sequencing function outcome, an additional content item having additional stage-transition content associated with the multiple interaction stages, wherein the modified vector data structure includes a data value representing a portion of the ratio of interactions with the stage-transition content, the portion being associated with the additional stage-transition content;

receiving, by the second machine-learning model as an input from the first machine-learning model, the modified vector data structure representing the stage graph and the included data value representing the portion of the ratio of interactions;

determining, by the second machine-learning model and based on the stage graph represented by the modified vector data structure and the included data value representing the portion of the ratio of interactions, the sequencing function outcome indicating the portion of the ratio of interactions;

calculating, by the second machine-learning model in the content sequencing module and based on the portion of the ratio of interactions, a transition probability of receiving an interaction with the stage-transition content and an additional interaction with the additional stage-transition content; and causing, based on the transition probability exceeding a threshold value, a content provider system to provide a recipient device with interactive content that includes the additional content item, wherein a device interaction with the interactive content transitions the recipient device among the multiple interaction stages.

2. The method of claim 1, further comprising:
determining, via a trained feature encoder of the stage prediction module, features of the content item; and
generating, by the stage prediction module, a representation of the content item that includes the stage graph and the features of the content item,
wherein the transition probability is calculated based on the features of the content item.

3. The method of claim 1, further comprising:
determining a topic of the content item and an additional topic of the additional content item,
wherein the transition probability is calculated based on the topic and the additional topic.

4. The method of claim 1, further comprising:
determining, for each respective content item of the set of multiple content items, a respective stage graph indicating a respective ratio of interactions with respective stage-transition content of the respective content item,
wherein identifying the additional content item is based on a comparison of each respective ratio of interactions to an additional threshold value.

5. The method of claim 4, wherein:
the modifying the set of multiple content items to generate the reduced set of multiple content items, is further based on:
a respective topic of each respective content item, and
the additional content item is included in the reduced set of multiple content items responsive to determining that the transition probability of the additional content item exceeds the additional threshold value.

6. The method of claim 1, wherein an additional data value of the vector data structure indicates the ratio of interactions with the stage-transition content.

7. The method of claim 1, wherein:
the stage graph includes multiple nodes associated with the multiple interaction stages in the online environment, wherein a particular one of the multiple nodes is associated with a particular one of the multiple interaction stages,
the method further comprises calculating additional transition probabilities associated with the multiple interaction stages, the additional transition probabilities calculated based on additional portions of the ratio of interactions with the stage-transition content.

8. A system for generating a recommendation for sequential content items for causing transitions among multiple interaction stages in an online environment, the system comprising a memory and a processor, the processor configured to execute:

a stage prediction module configured for:
generating, by a first machine-learning model included in the stage prediction module, a first representation structure of a first content item from a set of multiple content items, the first content item including first stage-transition content associated with multiple interaction stages in an online environment, wherein the multiple interaction stages are represented by the first representation structure, wherein the first representation structure includes (i) a first stage graph of the first content item, the first stage graph indicating a ratio of interactions with the first stage-transition content, and (ii) features of the first content item; and
modifying, by the first machine-learning model, the first representation structure to represent the first stage graph;
and a content sequencing module configured for:
modifying, by a second machine-learning model included in the content sequencing module, the set of multiple content items to generate a reduced set of multiple content items, the modifying based on historical interactions of each respective content item included in the set of multiple content items:

identifying, from the reduced set of multiple content items and by the second machine-learning model, a second content item represented by a second representation structure, the second content item including second stage-transition content associated with the multiple interaction stages, wherein the modified first representation structure includes a data value representing a portion of the ratio of interactions with the first stage-transition content, the portion being associated with the second stage-transition content;

receiving, by the second machine-learning model as an input from the first machine-learning model, the modified first representation structure representing the first stage graph and the included data value representing the portion of the ratio of interactions;

applying, by the second machine-learning model, a sequencing function to the modified first representation structure and the second representation structure to determine the portion of the ratio of interactions;

calculating, by the second machine-learning model and based on the portion of the ratio of interactions, a transition probability of receiving a first interaction with the first stage-transition content and a second interaction with the second stage-transition content; and selecting the second content item as a sequential content item for the first content item.

9. The system of claim 8, the stage prediction module further configured for applying a feature encoder model to determine the features of the first content item,
wherein the transition probability is calculated based on the features of the first content item.

10. The system of claim 8, the stage prediction module further configured for:
applying a topic detection model to determine a first topic of the first content item and a second topic of the second content item,
wherein the transition probability is calculated based on the first topic and the second topic.

11. The system of claim 8, the stage prediction module further configured for:
generating an additional representation structure for each additional content item in the set of multiple content items; and
determining, for each additional content item in the set of multiple content items, a respective stage graph indicating a respective ratio of interactions with additional stage-transition content of the additional content item,
wherein identifying the second content item is based on a comparison of each respective ratio of interactions to a threshold value.

12. The system of claim 11, the content sequencing module further configured for:
modifying the set of multiple content items to generate the reduced set of multiple content items further based on an additional topic of each additional content item, and
wherein the additional content item is included in the reduced set of multiple content items responsive to determining that the transition probability of the additional content item exceeds the threshold value.

13. The system of claim 8, wherein:
the first stage graph includes multiple nodes associated with the multiple interaction stages in the online environment, wherein a particular one of the multiple nodes is associated with a particular one of the multiple interaction stages,
the stage prediction module is further configured for calculating additional transition probabilities associated with the multiple interaction stages, the additional transition probabilities calculated based on additional portions of the ratio of interactions with the first stage-transition content.

14. A non-transitory computer-readable medium embodying program code for generating a sequence of content items for causing transitions among multiple interaction stages in an online environment, the program code comprising instructions which, when executed by a processor, cause the processor to perform operations comprising:
receiving, from a first machine-learning model and by a second machine-learning model, a modified representation structure of a content item from a set of multiple content items, the content item including stage-transition content associated with multiple interaction stages in an online environment, the modified representation structure being modified by the first machine-learning model to include a stage graph of the content item that indicates a ratio of interactions with the stage-transition content;
modifying the set of multiple content items to generate a reduced set of multiple content items, the modifying based on historical interactions of each respective content item included in the set of multiple content items;
a step for identifying, from the reduced set of multiple content items and by the second machine-learning model, a sequential content item for the content item, wherein the modified representation structure includes a data value representing a portion of the ratio of interactions with the stage-transition content, the portion being associated with additional stage-transition content of the sequential content item;
determining, by the second machine-learning model and based on the stage graph represented by the modified representation structure and the included data value representing the portion of the ratio of interactions, a transition probability indicating a likelihood of receiving an interaction with the stage-transition content and an additional interaction with additional stage-transition content of the sequential content item; and
causing a sequence of interactive content to be generated, the sequence of interactive content including the content item followed by the sequential content item.

15. The non-transitory computer-readable medium of claim 14, the operations further comprising:
determining a sequencing function outcome indicating the portion of the ratio of interactions with the stage-transition content; and
calculating, based on the portion of the ratio of interactions, the transition probability of receiving the interaction with the stage-transition content and the additional interaction with the additional stage-transition content,
wherein identifying the sequential content item is based on the transition probability.

16. The non-transitory computer-readable medium of claim 14, the operations further comprising:
determining features of the content item; and
further modifying the modified representation structure to indicate the features of the content item,
wherein the transition probability is calculated based on the features of the content item.

17. The non-transitory computer-readable medium of claim 14, the operations further comprising:
determining a topic of the content item and an additional topic of the sequential content item,
wherein the transition probability is calculated based on the topic and the additional topic.

18. The non-transitory computer-readable medium of claim 14, the operations further comprising:
determining, for each respective content item of the set of multiple content items, a respective stage graph indicating a respective ratio of interactions with respective stage-transition content of the respective content item,
wherein identifying the sequential content item is based on a comparison of each respective ratio of interactions to a threshold value.

19. The non-transitory computer-readable medium of claim 18, wherein:
the modifying the set of multiple content items to generate the reduced set of multiple content items is further based on:

a respective topic of each respective content item, and
the sequential content item is included in the reduced set of multiple content items responsive to determining that the transition probability of the sequential content item exceeds the threshold value.

20. The non-transitory computer-readable medium of claim 14, wherein:
the stage graph includes multiple nodes associated with the multiple interaction stages in the online environment, wherein a particular one of the multiple nodes is associated with a particular one of the multiple interaction stages,
the operations further comprise calculating additional transition probabilities associated with the multiple interaction stages, the additional transition probabilities calculated based on additional portions of the ratio of interactions with the stage-transition content.

* * * * *